(12) United States Patent
Dao et al.

(10) Patent No.: US 10,257,684 B2
(45) Date of Patent: Apr. 9, 2019

(54) SYSTEM AND METHODS FOR CRITICAL COMMUNICATION

(71) Applicants: Ngoc Dung Dao, Ottawa (CA); Nimal Gamini Senarath, Ottawa (CA)

(72) Inventors: Ngoc Dung Dao, Ottawa (CA); Nimal Gamini Senarath, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/180,681

(22) Filed: Jun. 13, 2016

(65) Prior Publication Data

US 2017/0171732 A1 Jun. 15, 2017

Related U.S. Application Data

(60) Provisional application No. 62/265,103, filed on Dec. 9, 2015.

(51) Int. Cl.
*H04W 76/00* (2018.01)
*H04W 4/90* (2018.01)
*H04W 76/50* (2018.01)

(52) U.S. Cl.
CPC .............. *H04W 4/90* (2018.02); *H04W 76/50* (2018.02)

(58) Field of Classification Search
CPC .............................. H04W 4/22; H04W 76/007
USPC ............... 455/404.1, 404.2, 90.1, 427, 456.1
See application file for complete search history.

(56) References Cited

U.S. PATENT DOCUMENTS

| | | | |
|---|---|---|---|
| 9,148,773 B2 * | 9/2015 | Daly | H04L 51/00 |
| 9,419,733 B2 * | 8/2016 | Marathe | H04H 20/59 |
| 2006/0194566 A1 * | 8/2006 | Oesterling | H04M 11/04 |
| | | | 455/404.1 |
| 2008/0318624 A1 * | 12/2008 | Hedtke | A61B 5/0002 |
| | | | 455/556.1 |
| 2009/0227223 A1 * | 9/2009 | Jenkins | H04M 11/045 |
| | | | 455/404.1 |
| 2010/0120392 A1 | 5/2010 | Youn et al. | |

(Continued)

FOREIGN PATENT DOCUMENTS

| | | |
|---|---|---|
| CN | 101466085 A | 6/2009 |
| CN | 101500214 A | 8/2009 |
| CN | 104244210 A | 12/2014 |

OTHER PUBLICATIONS

3GPP TR 22.879 V1.0.0 (Sep. 2015), technical report, 3rd Generation Partnership Project; Technical Specification Group Services and System Aspects; Feasibility Study on Mission Critical Video Services over LTE; (Release 14).

(Continued)

*Primary Examiner* — Congvan Tran (57) ABSTRACT

A system and method is provided for mission critical communications. In an aspect, a computer-implemented method may be implemented for a node device on a network to facilitate communication between a sending device and an intended recipient device. The node device may receive from the sending device a mission critical (MC) communication directed to the intended recipient device. The node device may process the received MC communication to produce processed MC data and cache some or all of the processed MC data. The node device may transmit at least a portion of the received MC communication, the processed MC data, and/or the cached MC data to the intended recipient device.

20 Claims, 8 Drawing Sheets

(56) References Cited

U.S. PATENT DOCUMENTS

| | | | |
|---|---|---|---|
| 2010/0231379 A1* | 9/2010 | Hutzler | A61B 5/411 340/539.12 |
| 2011/0003601 A1* | 1/2011 | Coutts | G08B 21/0415 455/456.1 |
| 2014/0087780 A1* | 3/2014 | Abhyanker | G06Q 50/01 455/521 |
| 2014/0297299 A1* | 10/2014 | Lester, IV | G06Q 50/22 705/2 |
| 2015/0141049 A1* | 5/2015 | Jiang | H04W 64/00 455/456.1 |
| 2015/0350152 A1* | 12/2015 | Flores | H04L 51/34 709/206 |
| 2016/0006855 A1* | 1/2016 | Osann, Jr. | H04M 1/72538 455/404.2 |
| 2016/0272112 A1* | 9/2016 | DeGrazia | B60Q 9/00 |
| 2016/0379473 A1* | 12/2016 | Bharti | G08B 25/016 340/539.11 |

OTHER PUBLICATIONS

International Search Report dated Jan. 22, 2017 for corresponding International Application No. PCT/CN2016/108943 filed Dec. 7, 2016.

\* cited by examiner

SYSTEM AND METHODS FOR CRITICAL COMMUNICATION

CROSS-REFERENCE TO RELATED APPLICATIONS

This application claims the benefit of related U.S. Patent Application No. 62/265,105, filed Dec. 9, 2015, and entitled "SYSTEM AND METHODS FOR CRITICAL COMMUNICATION".

FIELD OF THE INVENTION

The present invention pertains to the field of communication networks, and in particular to a system and method for providing reliable mission critical communication.

BACKGROUND

Communication networks provide communication services which are an important tool in allowing emergency or disaster responders to respond to emergency situations. Emergency responders can include police, firefighters, paramedics, etc. Communication networks can also be used by investigators during investigations of the cause of the emergency situation. Mission critical communication scenarios are discussed in a technical report of the 3GPP, titled TR 22.879 V1.0.0 (published in September 2015, which is hereby incorporated by reference in its entirety.

In emergency scenarios, network availability and/or reliability may be affected by the emergency situation, possibly disrupting normal communications, especially if part of the infrastructure is damaged or otherwise not available. Similarly, emergency communications place greater demands on the communication network infrastructure, potentially exceeding available network capacity. However, emergency responders at the scene and personnel at emergency control centers can greatly benefit from mission critical (MC) data being transmitted, received and stored, either during the emergency or for subsequent investigations.

For example, in prior art networks a data rate for a particular communication session may be set to a lowest rate by the slowest resource in the session. For instance, a limited resource may only be able to process audio or video at a low data rate causing the entire communication session to proceed at that low data rate.

While this solution allows the session to be operable, potentially useful information may be lost as a result of restricting communications to the most limited resource in the session.

Accordingly, there is a need for improved networking services for providing mission critical communication services for critical communications, especially in the case of an emergency.

This background information is provided to reveal information believed by the applicant to be of possible relevance to the present invention. No admission is necessarily intended, nor should be construed, that any of the preceding information constitutes prior art against the present invention.

SUMMARY

Accordingly, embodiments cache MC (possibly at multiple locations) to help facilitate reception and/or subsequent retrieval.

An aspect of the invention provides a method for mission critical (MC) communication. Such an MC method includes receiving a MC session request for an MC communication and caching some or all of the MC data associated with the MC communication. The method also includes subsequently and/or concurrently transmitting at least a portion of the MC data on to an intended recipient device. Either one or more access points (APs), or user equipment (UE), or both, can cache the data. In some embodiments the method further includes prioritizing network resources for MC communication. In some embodiments the method can also include instructing a device, such as UE or network node, to store and/or transmit sensor data which may be relevant to responding to an emergency situation. In some embodiments the UE transmits MC data to a second UE for relaying the MC data to the network, in the event of disruption in the communication links between the UE and the network.

In an aspect, a system is provided for MC communications over a network. In an aspect, the system may include a sending device and an intended recipient device. The sending device and the intended recipient device each connected to the network and operative to enter a MC mode to establish a MC session for exchanging MC communications including MC data over the network. At least one of the sending device or the intended recipient device may be operative to receive a MC session request and to enter the MC mode to establish the MC session in response to receiving the MC session request. In an implementation the system may further include a receiving device intermediate between the sending device and the intended recipient device. The receiving device may also be operative to establish the MC session with the sending device and the intended recipient device. The receiving device receiving the MC data from the sending device and forwarding at least a portion of the received MC data to the intended recipient device. In some cases, the receiving device may also cache some or all of the received MC data. The cached MC data may be stored for archival, re-transmission, or other purposes as necessary.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

As used herein, a "network" or "communication network" may service various devices including, but not necessarily limited to, wireless devices. Such a network may include a radio access portion and a backhaul portion. The network may further comprise various virtualized components as will become readily apparent herein. A primary example of such a network is a 5G network which is reconfigurable and capable of network slicing, as described below.

It should be noted that examples are provided herein for mission critical (MC) communication, which can include, but are not limited to, special critical situations accidents, explosions, crime or riot scenes, natural disasters (e.g., earthquakes) and other emergency situations. However, it should be noted that the systems and methods discussed herein can be extended to other communication services with similar requirements. It should be further understood that the term user equipment (UE) is used to refer to devices that connect to the communication networks for the purpose of exchanging data, and includes general purpose computing devices such as phones and tablets, as well as MC devices configured for emergency responders. UE may further include devices that may not generally be considered "user" devices, such as sensors, appliances, robots, and other devices that may be operable to collect, store, and/or communicate data to networks.

In emergency situations, critical communications may be unable to reach their destinations for a variety of reasons, including interference, damaged infrastructure, "coverage hole", "isolated coverage", etc., which may be coupled with life threatening situations preventing a user from moving to an area where coverage is available.

In some aspects of this disclosure systems and methods are proposed to handle scenarios when the network (or a portion thereof) is not reliable or not available. In MC situations, however, the availability of the network to transmit the MC communication, is not the primary concern, but only one factor to be considered and mitigated if necessary. One primary concern in MC situations is that the device sending MC data be able to offload its collected data onto the network as quickly, efficiently, and securely as possible. Another primary concern is that in MC situations the device requesting an MC session be able to obtain priority resources from other devices involved in the MC session including for instance, and the other devices capturing local sensor data, receiving, storing, and/or forwarding MC data.

Parties to an MC session may comprise, for instance: i) device to device communications (either direct or through the network); ii) device to MC Control Centre through the network (typically via at least one network node); iii) all party communication (multi-cast) conference call; and, iv) relayed communications where a device uses another device to gain access to the network and the MC session.

In some aspects, the MC Centre can re-assign parties to the MC session as necessary. For instance, where a UE is a party to the MC session and it moves from one location to another, the MC Centre can push or extend a MC session request to a node that is not currently part of the MC session to ensure coverage of the MC session. In another example, a node can enlist a local UE as a relay to assist an ongoing MC session as a sending device in proximity to the local UE requires assistance maintaining connectivity to the MC session.

In an aspect, the present disclosure provides for a system and method whereby a receiving device, such as a node of the network either proximate to a sending device or logically intermediate between the sending device and an intended recipient device, is operative to receive a request for an MC session from the sending device, and to receive and secure MC data associated with the MC session for subsequent handling by the network to deliver to the intended recipient device.

For instance, in an aspect the MC session may comprise an emergency call (voice, video, and/or other data) from a sending device placed to the network. The node may be operative to initiate an MC session with the sending device, and to receive and store some or all of the MC data associated with the MC session irrespective of whether the intended recipient of the emergency call has acknowledged and established a session with the sending device. Accordingly, the MC data can be sent by the sending device and captured by the node receiving device as soon as possible after the MC session request has been submitted and potentially before the intended recipient picks up or acknowledges the MC session request.

In some implementations the sending device may further comprise a requesting device that initiates the MC session by sending a MC session request to the network. In some implementations, the sending device may act responsive to a received MC session request originating from another requesting device such as another UE, a network node, or a control center.

In an aspect, at least one device involved with the MC session may be operable to optimize at least one local resource irrespective of limitations between devices on the MC session. For instance, a sending device may be operable to capture and store sensor data (such as video data) at the highest available data rate, and to forward a limited copy of the captured sensor data in accordance with a limitation of the MC session. The limited copy of the captured sensor data may comprise data sampled at a lower data rate than the captured and stored sensor data. In an aspect, a receiving device may be operable to receive captured data and to forward a limited copy of the received captured data to another device on the MC session, such as the intended recipient device. The receiving device may further be operable to store the received captured data and/or to additionally forward the received captured data to an intended recipient of the MC session.

In an aspect, at least one device taking part in a MC session may be operative to define specific resources (such as sensors, applications, and interfaces of the device) as MC resources. For instance, device sensors may be defined as MC session sensors and subsequently prioritized over other resources to ensure reliable and efficient capture, storing, and/or transmission of MC data collected by the device sensors.

By way of example, as part of a MC session a UE may act as a sending device, and may capture audio and video data at the highest available data rate (a "capture rate"). The captured audio and video data may be stored at the capture rate, or may be stored at a lower data rate if available storage is limited. The UE may further be operative to forward the captured audio and video data at either the capture rate, or at the lower data rate, to a node of the network that is part of the MC session as a receiving device. The node may be operative to receive the captured data and to store it at a received data rate, or a lower data rate, and to forward some or all of the received data to another device that is part of the MC session at a lower data rate.

For example, an intended recipient device may comprise a receiving UE that is part of the MC session. The intended recipient device UE may need to receive the MC data in order to provide assistance to a user of the sending UE. However, the intended recipient device UE may have limited connectivity to the node. Accordingly, the sending UE can capture the highest quality MC data and forward it to the node, and the node may process the received MC data to produce limited MC data for transmission to the intended recipient device UE having limited connectivity. The node may further be operative to forward the received MC data onto a central MC control center that may be an additional intended recipient of the MC data.

In an aspect, a device, such as a network node, may be operative to block or cache third party data that is not part of the MC session. The device may further be operative to release and forward the blocked third party data after the MC session has concluded. Accordingly, the device may be operative to maintain available communication channel bandwidth during the MC session to provide priority access to MC communications and data transfer.

By way of example, a node may be operative to block all non-MC wireless communications during a MC session to provide priority access to the MC session devices. Furthermore, third party devices on the network itself may have their access limited, or their traffic shaped, to provide sufficient bandwidth to allow the MC data to reach the intended recipient. In an alternate example, a UE involved in the MC session may block or cache third party data intended for the UE that is not related to the MC session.

Figure 1:
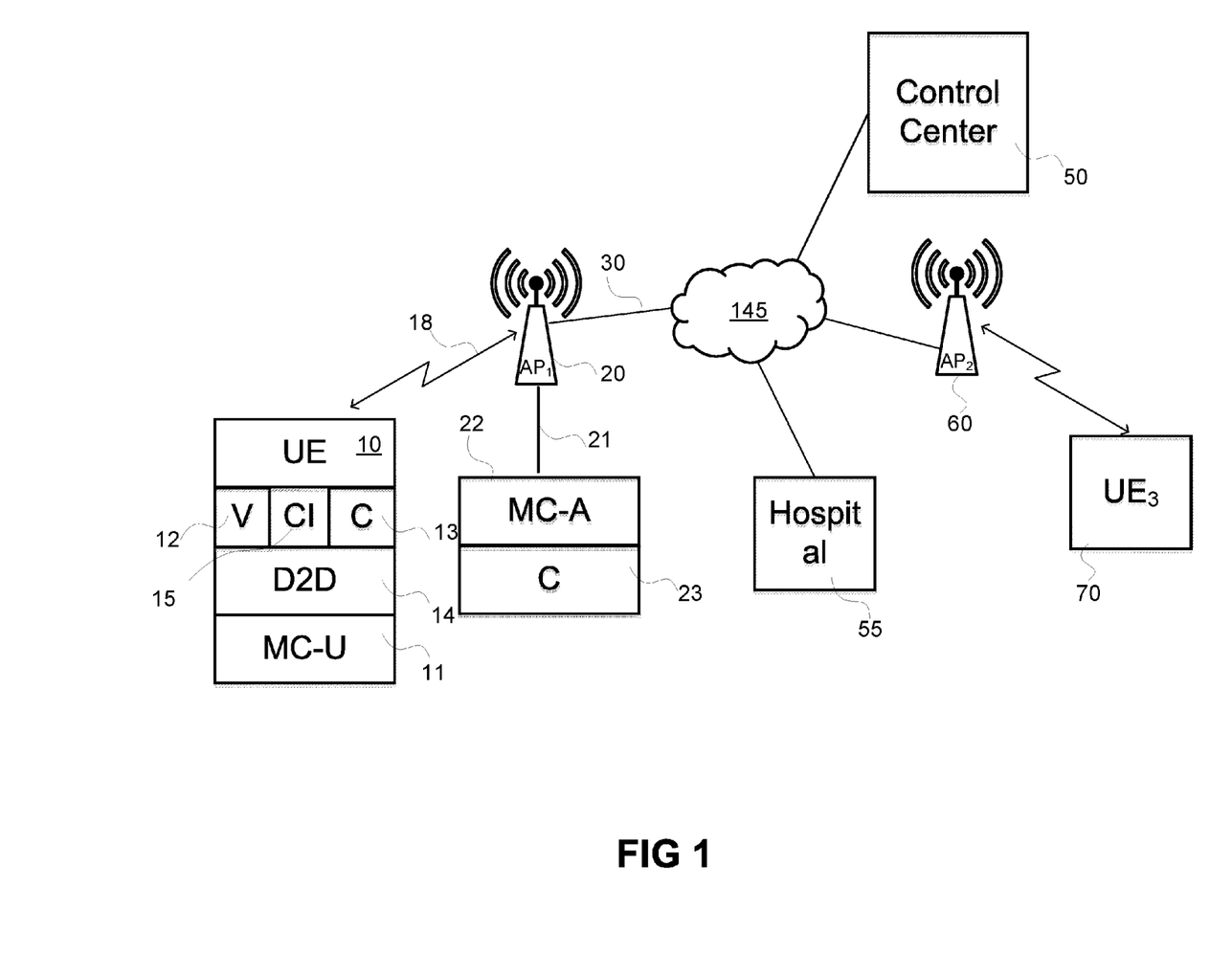
FIG. 1 illustrates an example network for providing mission critical (MC) communications, according to an embodiment.

FIG. 1 illustrates an embodiment of an exemplar system for providing MC communications. FIG. 1 illustrates a sending device, denoted as UE 10 in the example, which is in communication with a network 145 and is engaged in a MC session with a node of the network 145, denoted as AP 20 in the example, as a receiving device. As part of the MC session, the UE 10 is operative to send a MC communication to the AP 20.

In some aspects, the UE 10 may have a dedicated MC application 11 (MC-U 11) enabled to handle MC communication requests and transmissions. In other aspects the UE 10 may comprise an operating system or suite of applications that include MC functionality, rather than a dedicated MC-U 11. For instance, the MC mode of the UE 10 may comprise a plurality of applications executing on the UE 10 that each inter-operate to provide MC functionality on the UE 10 when the MC mode is selected. When the MC mode is de-selected, the plurality of applications may disable MC functionality and return to a normal mode of operation. Accordingly, MC functionality may be provided by a dedicated application, dedicated module, or specific mode of operation for a general application or module of the UE 10.

Inclusion of MC functionality on the UE 10 allows for specific MC functionality at the UE 10, but it is not a requirement for all embodiments. In some aspects, the UE 10 may not have a dedicated MC application MC-U 11, but can engage a MC communication through a MC service offered by the network 145. For instance, the UE 10 may request a MC session through contacting a dedicated MC service, e.g. 911 service or equivalent, in which case data transmitted by the UE 10 to the MC service may be identified as MC data by the network (or AP 20 that receives the service request). Accordingly, any user or device may engage an MC service as the MC functionality is offered from the network side.

In either case, an MC-enabled UE 10 may include a cache (C) 13 for locally storing MC data, and to support retransmission of the MC data should it be desirable, for instance if the communication network is unavailable or an intended recipient fails to receive transmitted MC data.

The UE 10 may include sensors that may be designated as MC sensors for capturing MC data. For example, video camera (V) 11 for capturing video data, and other devices which can provide valuable information in emergency situations, including microphones, GPS, and motion sensors. Specially equipped UE devices for emergency responders (hereafter officers) can further be equipped with other sensors (smoke, temperature, explosive, image recognition sensors, etc.) relevant to their mission profile. The UE 10 comprises at least one communication interface (CI) 15, which can include, for instance, radio transceivers for communication with communication networks, for example a 5G, or LTE or 3G interface, and device-to-device (D2D) interface 14, such as Bluetooth™, Wi-Fi, near field, and other device-to-device interfaces.

As the sending device, the UE 10 is operative to collect, in some cases locally store, and transmit MC data to an intended recipient device. In an aspect, the UE 10 may lack specific MC functionality, but such functionality is effectively provided by the network-side devices. For instance, the UE 10 may either receive or place a request for a MC session (similar to placing a 911 call to a network). The UE 10 may then capture, store and send data to the network 145. The network 145 will treat the data sent as part of the MC session as MC data. In an implementation a node receiving the MC data may acknowledge the MC session and, acting as a receiving device, receive the MC data from the UE 10. The node may forward the received MC data to an intended recipient device.

Alternatively, the node may process the received MC data and selectively cache some or all of the received MC data (for instance by data type) as cached MC data. The node may further selectively forward some or all of the received MC data, processed MC data, and/or cached MC data, to the intended recipient device. In an aspect the UE 10 may include MC functionality, for instance, to capture, store and/or forward specified MC data. The stored and/or forwarded data may comprise portions of the captured data. In an aspect the MC functionality may further be operative to change UE 10 functionality based upon a local operating environment. For instance, the MC functionality may limit UE 10 functionality to conserve battery life, such as by storing captured data at a high data rate, but only transmitting the captured data at a low data rate.

In the example of FIG. 1, the intended recipient device may comprise, for instance, the control center 50, the hospital 55, or the receiving $UE_3$ 70 available on the network 145. In some aspects, the MC-U 11 is operative to receive an MC request comprising instructions indicative of an emergency condition, and in response to the reception of those instructions to enter the MC mode and to activate MC sensors, collect MC data, transmit and/or cache MC sensor data as MC data. In some aspects, the MC-U 11 is further operative to itself generate and transmit an MC request to the network 145. The MC request asking for an MC session with a resource available on the network 145 and indicative that the UE 10 needs to transmit MC data to the network 145.

In the example of FIG. 1, UE 10 communicates with the network 145 via a first Access Point (AP) 20 over a wireless communication link 18. In this example, the AP 20 is operable to execute MC functions, for instance the AP 20 may be configured with its own MC application, which can be a software application executable on a processor of the AP or related device, a dedicated module, or dedicated functionality provided by one or more applications executing on the AP 20, hereinafter referred to as MC-A 22 and as similarly described above in relation to the UE 10.

The AP 20 may further comprise a MC storage function for caching MC data, for example cache 23. The MC-A 22 and the cache 23 can reside in a specially designed MC storage device which may be hardened for disaster situations (e.g. similar to an aircraft black box). In an alternate implementation, the MC-A 22 may comprise a module of the AP 20 operable to provide mission critical functions, and the storage may either be local, remote, or a combination of both. In either case, the MC-A 22 enables the AP 20 to carry out the MC functions.

Various types of network nodes, including for instance: access nodes, radio nodes, Wi-Fi Access Point, Device-to-Device devices, fixed public switching systems, modems, routers, or servers, can be equipped with an MC-A 22 and associated storage functions, for providing MC services as may be required. In general, the MC-A 22 will be provided by a fixed infrastructure component of the network 145 in close physical or logical proximity to a UE 10 engaging in a MC session. For instance, the fixed infrastructure component may comprise a first access node to the network or a first reliable node available on the network 145. The first reliable node may comprise, for instance, the node with the strongest wireless link to the UE 10, the most reliable device available to the UE 10, or the most convenient device to the UE 10 or the network 145. In some cases, the node may comprise a special purpose MC regional or neighborhood node for providing MC services on the network 145. The MC-A 22 can receive MC data in the form of datagrams or packets of different communication types (voice, video, data, text), and store the received MC data in the cache 23.

An MC session can be initiated by any participant to the MC session. For instance, in an aspect the UE 10 may generate and forward a MC request to the AP 20 or the control center 50. In an aspect, the AP 20, another $UE_3$ 70, or the MC control center 50 may initiate the MC request. The control center 50 may comprise, for instance, an emergency response node, such as a "911" call center, emergency call center, or an emergency response office. The control center 50 can include a control unit equipped with functions to receive MC data from MC-A 22 or MC-U 11. The MC data for each MC session (e.g., for each UE) can be stored in a corresponding data file. The data file may include header information indicating a time of the MC session that communicated the MC data, a sending device identifier, for example a UE ID such as a telephone number, MAC ID, or other identifier. The data files of MC sessions can be forwarded to the control center 50, for instance by AP 20, using a standard data transfer protocol such as file transfer protocol (FTP).

When any type of requesting device (mobile, wireless, or fixed) initiates a MC request intended for an intended recipient device such as the control center 50, the AP 20 can receive the MC request, and process the MC request to assign network resources (spectrum, bandwidth, transmit power, MC-A storage, etc.) to service the MC session. The network resources may include, for instance, network nodes and UEs involved in the MC session.

The AP 20 communicates with network 145 via communication link 30. This allows for MC sessions to be established through AP 20 and disaster control center (CC 50) 50, Hospital 55, or other receiving devices, such as other receiving UEs (for example $UE_3$ 70, via a second AP 60). In some embodiments, a node such as the AP 20 can be configured to cache and forward MC data to both CC 50 and hospital 55.

Embodiments address situations wherein link 30 may be damaged or overloaded. Depending on the emergency situation, link 30 may be temporarily disrupted, severed, or its capacity diminished (for example its bandwidth is limited such that it can accommodate text or voice calls, but not video). It should be appreciated that link 30 is not typically a single link, but is often a network of links and nodes. Accordingly, links can often be switched and re-routed to re-establish communication with the network 145. However, this may take a period of time, during which critical emergency data may be lost for typical networks. Accordingly, in the embodiment, MC data may be cached for subsequent transmission, once communication is restored (or retrieved, depending on the nature of the emergency). Further, while only a single link is illustrated, it should be appreciated that there are two links: downlink (DL), e.g., from control center to UE, and uplink (UL), e.g., from UE to control center. It is possible that the uplink and downlink may be differently affected in an emergency situation. For example, the DL connection may be good, whereas the UL connection may be poor. Further, it is possible that only a fraction of data may be received. The MC-A 22 of the AP 20 may cache all or part of data it receives, in either or both the DL and the UL. Further, it is noted that link quality may be sufficient for an MC session to be established, but the link quality may drop during the session.

An MC session can be triggered by the disaster control center 50, UE 10, AP 20, or by a non MC-equipped device making an emergency call (e.g., dialing 911 in some jurisdictions). Once an MC session request has been received, or initiated, by the AP 20, the AP 20 may be operable to prioritize its resources to the entities involved with the MC session, and stores all of the received mission critical data received in its cache 23.

In an aspect, the AP 20 begins to cache mission critical data as soon as it is received and prior to reception by the intended recipient device, i.e. the called party (e.g., prior to establishment of the call with the called party). Thus, potentially critical MC data can be stored, even before the intended recipient device receives the MC data or the called party answers the call, for subsequent forwarding and retrieval. Further, in some embodiments, MC data can be collected by automatic or manual activation of microphone, video camera and sensors (smoke, temperature, explosive, image recognition sensors, etc.) of the UE 10.

Figure 2A:
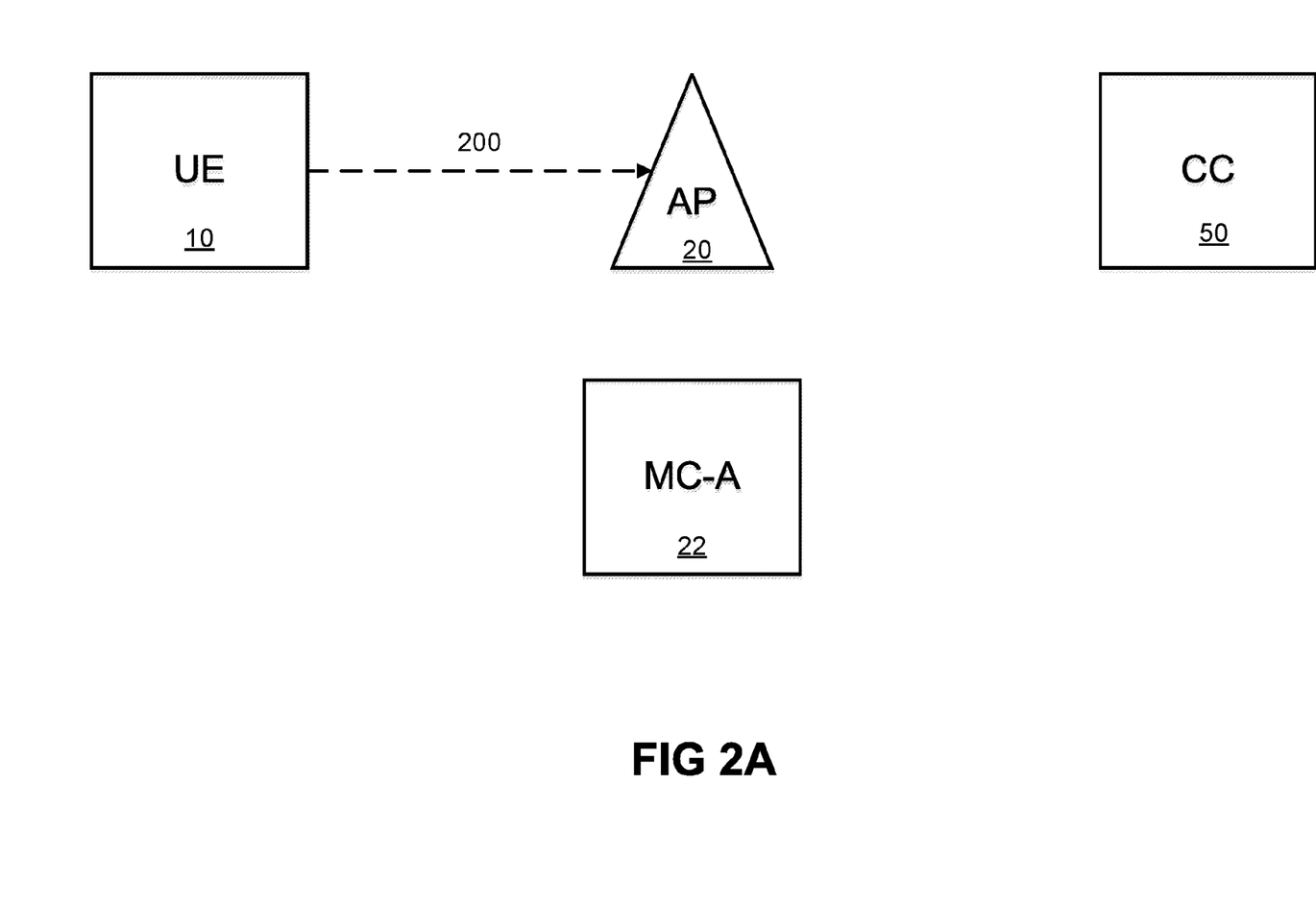
FIGS. 2A-D illustrates message flows for a user equipment (UE) initiated MC call, according to an embodiment.

FIGS. 2A-D are block diagrams of message flows that illustrate an embodiment of a method for a sending device initiating a MC session. In the exemplar embodiment the sending device comprises UE 10. FIG. 2A illustrates Step 1 of the UE 10 initiating an MC session by placing an MC call 200 to CC 50, which is received by AP 20. If suitably configured, the sending device UE 10 has an MC cache 13 to cache all, or some, types of MC data (e.g. video) associated with the MC session. This caching can be useful, for instance, if there are delays in establishing the MC connection with the AP 20, a need for re-transmission of the MC data, or simply to maintain a local archive of the MC data.

Figure 2B:
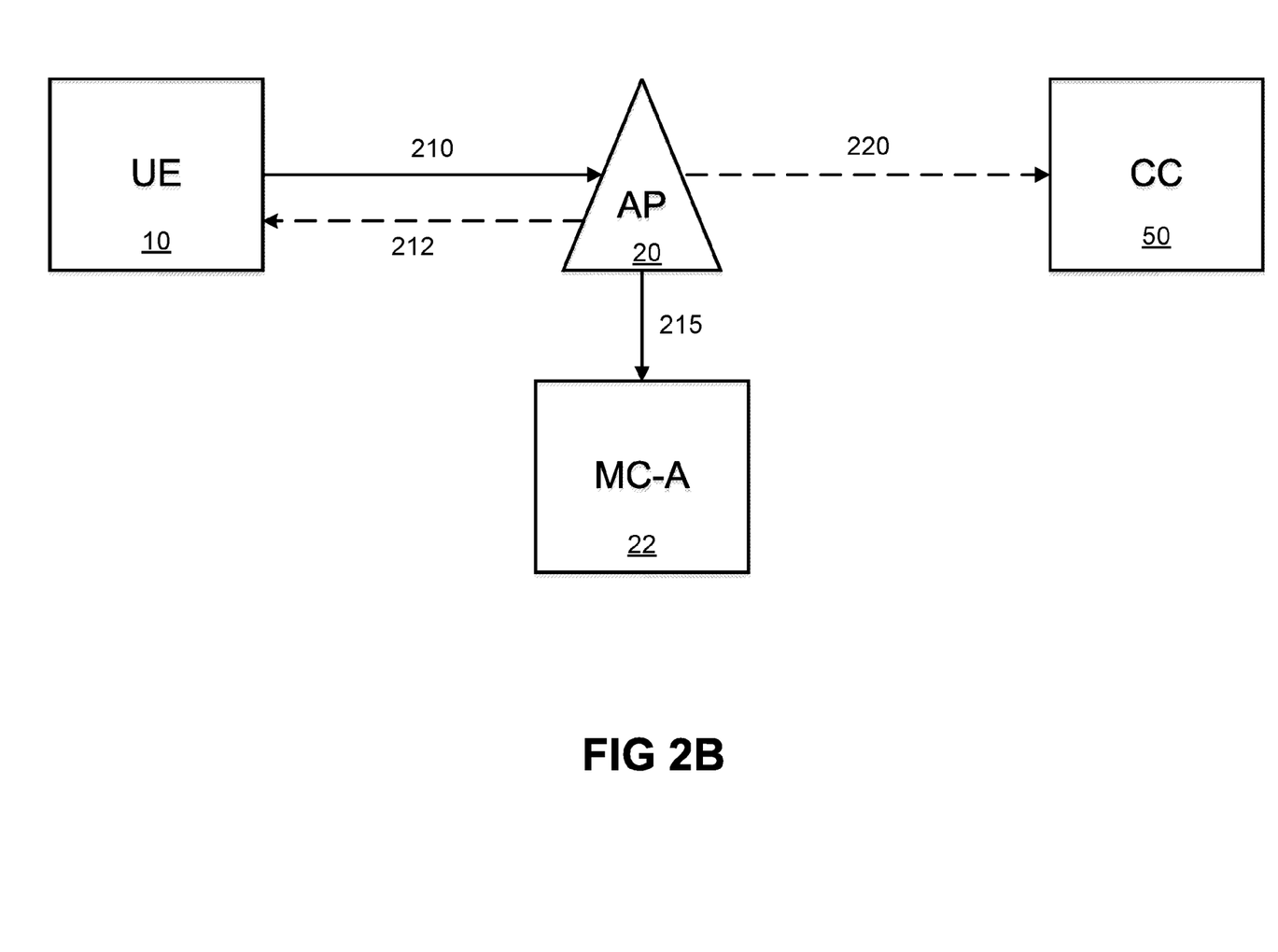

FIG. 2B illustrates Step 2 in which AP 20 recognizes the MC request and initiates an MC session. In addition to receiving an explicit MC request that designates a communication as an MC request, AP 20 can be configured to recognize communications to specific services, such as emergency calls (e.g. 911, 999 calls). Once the MC request has been recognized, the AP 20 performs two tasks. The AP 20 initiates the MC-A 22 such that MC data received by the AP 20 is cached 215. The AP 20 also forwards a MC session request 220 to the intended recipient of the MC request, in the example of FIG. 2B the control center, CC 50 to establish the MC session. In some embodiments, the AP 20 may also communicate a session request response 212 to the UE 10 to establish the MC session. As will be appreciated, the MC session will likely encompass a plurality of nodes between the UE 10 and the CC 50 across the network 145, though these are not explicitly identified in the figures. In general, the plurality of nodes will each comprise a relay device, operative to establish a MC session and relay data directed to the parties, but will not generally generate or receive data as an intended recipient. In some implementations one or more of the plurality of nodes may further cache some or all of the MC data sent or received by the one or more of the plurality of nodes.

Once established, the parties to the MC session may exchange MC data, either automatically or manually, without waiting acknowledgment from the other parties to the MC session. Depending upon the requirements, the system may allow for confirmation that the intended recipient device has initiated reception of the MC session while the sending device is communicating. In an aspect, the AP 20 may be operative to establish the MC session with the UE 10 prior to the intended recipient device acknowledging the connection. Accordingly, in the aspect the UE 10 may initiate MC transmissions as soon as possible after reaching a network resource.

For instance, the UE 10 may send MC data to the CC 50 as the intended recipient, without waiting for the CC 50 to directly acknowledge the session or complete a handshaking procedure to establish a connection. Similarly, the CC 50 may communicate MC data to the AP 20 and the UE 10 without waiting for the intended recipient to acknowledge the communication.

It should be appreciated that some protocols such as UDP do not have an establishment phase. In such protocols, the node may be operative to identify data packets transmitted as MC data to initiate a MC session (i.e. acting as a MC session request), and to selectively cache and/or forward the identified MC data to the intended recipient device. In an aspect, the AP 20 may be operative to employ deep packet investigation to identify MC data packets, and to forward the identified MC data packets to MC-A 22 for caching and/or forwarding to the intended recipient (CC 50).

Accordingly, for Step 3: In an aspect, the sending device can start sending MC data 210 to the AP 20 before the intended recipient (i.e. CC 50) acknowledges the MC request. In some embodiments, the sending MC data 210 comprises sending multiple types of data collected by MC sensors of the sending device (i.e. audio, video, image, temperature, location, etc.) are transmitted to the network AP 20. In some implementations, while waiting for the MC session establishment and for the intended recipient device to join the MC session, the sending device (i.e. UE 10) may receive a MC session request response 212 from the AP 20 to start transmitting the MC data. The UE 10 may provide an indication to a user of the UE 10, for instance by sounding a tone, vibrating, and/or displaying a visual indication on a user interface of the UE 10.

Figure 2C:
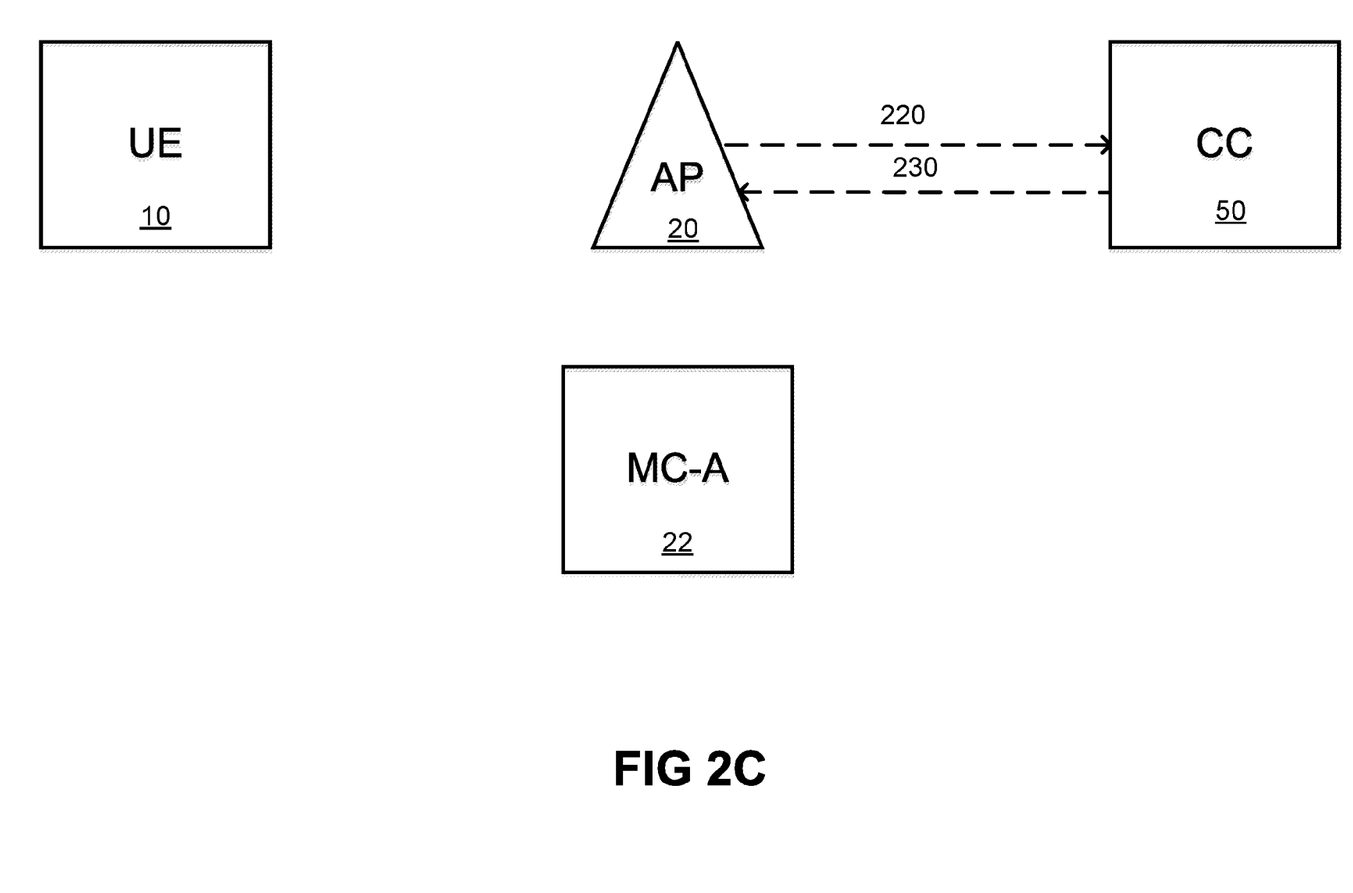

FIG. 2C illustrates the CC 50 receiving a MC session request 220 from the AP 20 and responding to the AP 20 with a MC session request response 230. The AP 20 may cache a selected set of the received MC data, which may comprise some or all of the MC data received from the sending device UE 10.

Figure 2D:
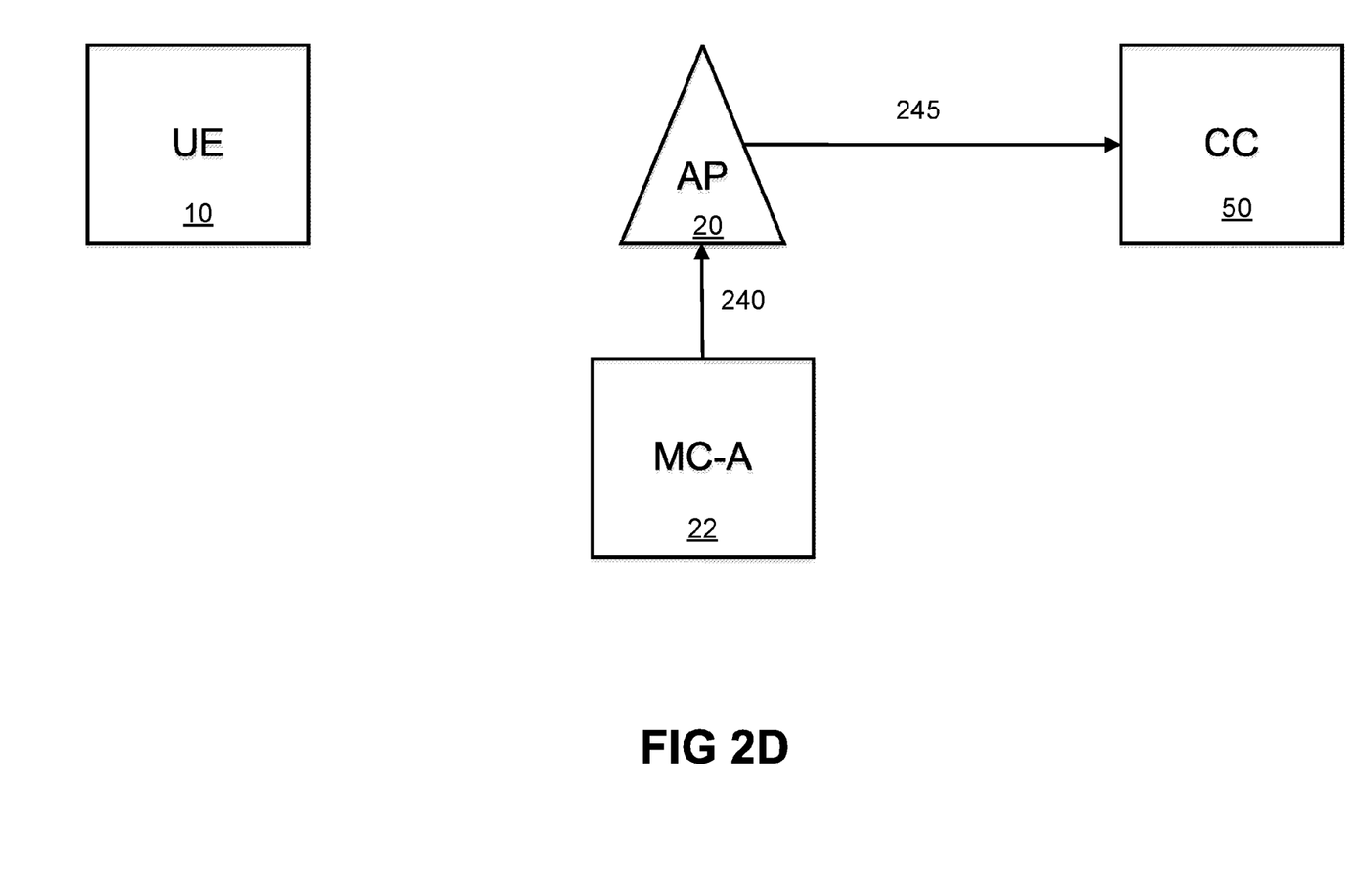

FIG. 2D illustrates the MC-A 22 communicating through AP 20 to forward 245 the cached MC data to the CC 50. Accordingly, The MC data may be forwarded 245 to the CC 50 after the UE 10 has started transmitting the MC data, and may be forwarded 245 to the CC 50 even if the connection with the UE 10 has been disrupted before the CC 50 is able to access the MC session. It should be appreciated that if the UE 10 is still transmitting the MC data, the forwarded 245 MC data may comprise full or partial live MC data, cached MC data, and/or a combination of both live and cached MD data.

Accordingly, for Step 4: Once the UE 10 has established a MC session with a node, i.e. the MC-A 22 at the AP 20, the node can perform one or more of the following tasks:

Option 1: Forward all MC data without further caching.

Option 2: Forward some types of MC data (e.g. voice), and keep receiving and caching the other types of data (e.g. video, SMS). This option can be useful if the connection from the node to the intended recipient device (e.g. CC 50) has limited capacity and/or poor quality.

Option 3: Forward and cache all types of MC data. This option can be useful if the link is intermittent, and the quality at any given point of time is variable.

Option 4: Cache selected (some, or all types of) MC data, and concurrently transmit the previously cached data to the CC 50. Option 4 effectively time shifts delivery of the MC data by the duration of the lag between the time the UE 10 established the MC session, and the time the CC 50 established its corresponding MC session.

The MC data may be selected for caching, for instance, based upon a data type identified in header information associated with the MC data. For instance, the node may be operative to select only voice data from the MC data and to cache the selected voice data.

In general, the node may process the received MC data, and then selectively cache some or all of the processed MC data. The node may further forward to the intended recipient device any (or all) of the received MC data, the processed MC data, and/or the cached MC data.

In some embodiments, cached MC data can be deleted by the node once the intended recipient device acknowledges receipt. In other embodiments, the node may retain the cached MC data. In an aspect, the intended recipient device may acknowledge receipt, but communicate a request that the node retain the MC data either for a specific duration or until instructed to delete by a subsequent external command (e.g. submitted through a device on the network 145 by authorized staff).

A procedure for an embodiment of a downlink MC session request directed to UE 10 will now be discussed.

Step 1: In an aspect, a sending device comprising a UE 10 for an emergency responder at a crisis scene receives an MC session request from a CC 50 or command UE (i.e. UE$_3$ 70). In an aspect the UE 10 may be configured to automatically activate specified MC sensors (e.g. camera, microphone, location, thermometer, etc.) to capture the MC data for storage and/or transmission in response to receiving the MC session request. In an aspect, the UE 10 may require manual activation of one or more MC sensors as selected by a user, to capture the MC data. In an aspect a combination of automatically and manually activated MC sensors may capture the MC data.

Step 2: A variety of types of captured MC data can then be sent to the intended recipient device via AP 20. In an aspect, the AP 20 comprises an automatic MC receiver (e.g., MC-A 22) to store MC data received from the sending device (i.e. UE 10).

Step 3: During the MC session, depending on the nature of the situation (e.g., conditions on link 30), the AP 20 can store all or some of the received MC data, in addition to forwarding some or all of the MC data to the intended recipient device if possible.

Step 4: After the MC session has been completed, the AP 20 can forward any remaining cached MC data to the intended recipient device (CC 50).

Step 5: Cached MC data can be deleted once authorized. In an aspect deletion may be authorized by reception of a confirmation of receipt sent by the intended recipient device. In an aspect, the deletion may be authorized by reception of an external authorization command (e.g. initiated by authorized staff). In an aspect, the deletion may be authorized after a pre-defined period of time has passed from either the reception of the MC data from the sending device, or the reception of a confirmation of receipt sent by the intended recipient device.

If many UEs are involved in MC calls, the AP with MC-A 22 will fully or partially cache data of all UEs. The MC-A at AP will forward UEs' packet data to control center according to some predefined rules, for example FIFO (First In First Out), or based on a ranked order of importance, or set up parallel transmission of UEs data at the same time if the server of control center support.

Further, in some embodiments the network access nodes also cache MC data sent from another party to the MC UE. Accordingly, should the emergency responder be unavailable to receive a call, it can be retrieved by the UE from the cache, which will be useful in situations where link 30 subsequently becomes unavailable.

Embodiments include one or more smart features for prioritizing MC calls. A suitably configured UE can prioritize resources for MC communications, including available memory, battery level, etc. For example, a UE measures the battery level to decide which data will be captured and sent to the network. The MC-U 11 determines battery condition, for example by input from the battery management module (not shown) of the UE and chooses which data and format to transmit to conserve energy if the battery condition is below a threshold. Further, conserving resources can include turning off some functions (for example the UE display) to conserve energy. The remaining capacity of local memory of UE can be measured so that MC-U 11 can select which types of data to cache or to delete some data segments that have been successfully sent to the network.

In an aspect, a device may be operative to prioritize resources when a MC session is established. For instance, a UE 10 may be operative to monitor a power level of a batter and, if the battery is low (i.e. the monitored power level drops below a threshold), the UE 10 may enter a low power state that reduces power consumption to conserve battery life. For instance, in an aspect, the low power state may comprise throttling communications and/or restricting device operations to extend battery life for the duration of an MC session. For example, a video camera equipped UE 10 may transmit a lower bandwidth type of MC data such as voice or text data, or lower the data rate of captured voice or video data rate. In an aspect, the UE 10 may just transmit data packets containing vital information from one or more sensors, or use a narrow (e.g. 15 KHz) bandwidth of air interface instead of the full available spectrum (e.g. 20 MHz for instance) to reduce the energy consumption in device signal processing modules. As an example, a UE 10 may initiate a MC session, and start capturing video as MC data at an emergency scene. Once the battery level falls below a pre-defined threshold, the UE 10 can discontinue video capture (possibly with a prompt to the user to provide an option to override the default of stopping video capture). This operation may be useful to allow other MC sensors, such as location sensors, voice data, text data, and alarm functions to continue for a longer period of time. This functionality may allow supporting responders locate the UE 10 (and the possibly injured/unconscious user).

In some embodiments, multiple nodes on the network 145 can listen to the same MC session and store related MC data to ensure data retention redundancy. Accordingly, should one of the multiple nodes (or their associated backhaul links) fail, the other nodes can cache and transmit the MC data to ensure continuity of the MC session.

In some embodiments, neighboring nodes will coordinate with a serving node to reduce interference to MC sessions by prioritizing MC transmissions across the network 145. In some aspects, multiple radio nodes may coordinate to send the same signal (same modulation and coding scheme) in the same carrier frequencies to UE 10 to boost the received power at the UE 10.

Figure 3:
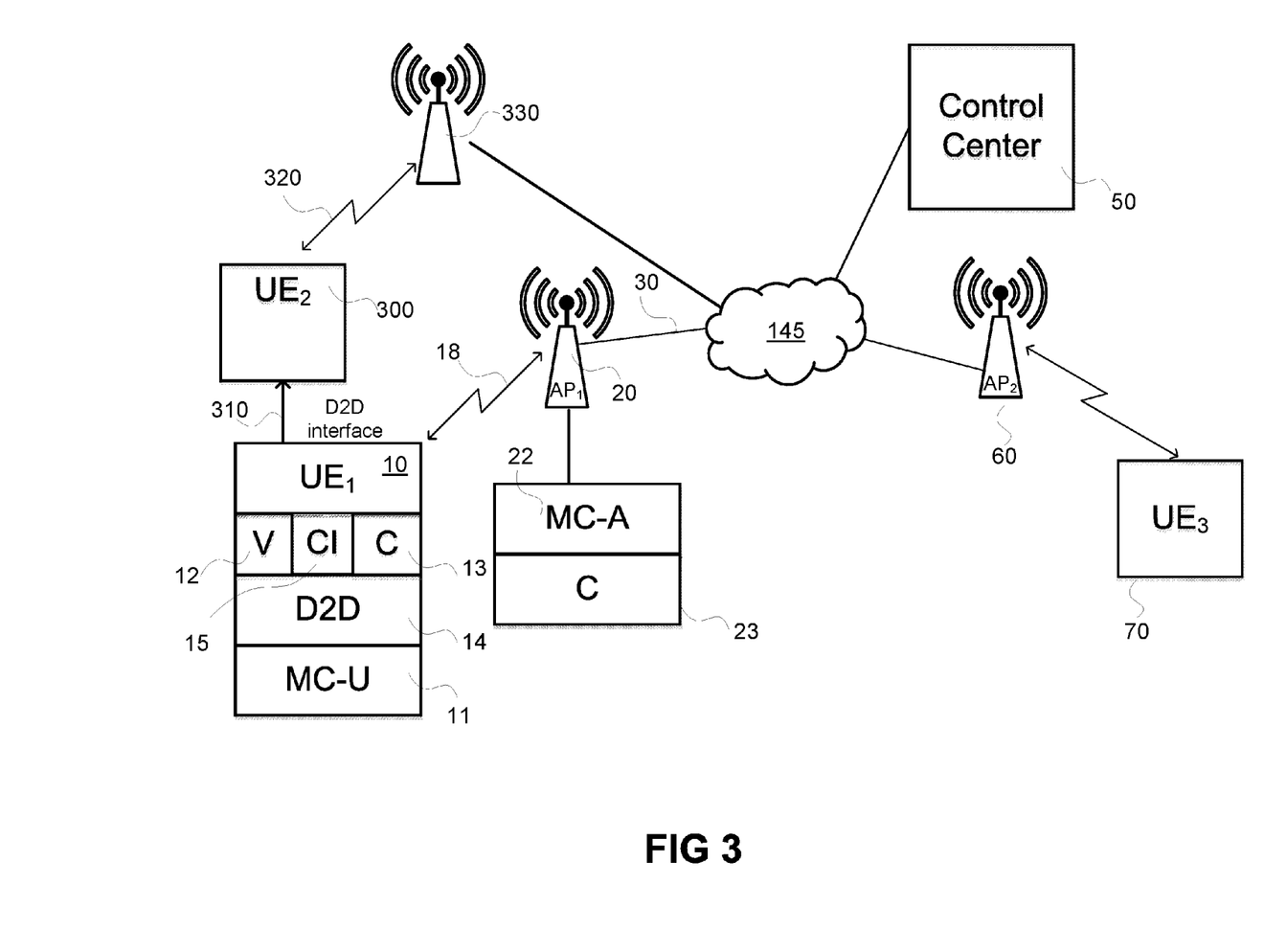
FIG. 3 illustrates an embodiment which allows for UE to UE relaying of MC data using a device to device interface.

FIG. 3 illustrates an embodiment which allows for device to device (D2D) relaying of MC data. For example, in an emergency situation $UE_1$ 10 may lose contact with AP 20, for instance if any of AP 20, link 30, or both fail, or if $UE_1$ 10 moves out of contact from AP 20. Normally a call would be handed off to another AP which can serve $UE_1$ 10. However, in an emergency situation, the $UE_1$ 10 may be located in a coverage hole, in which no other AP can communicate directly with $UE_1$ 10. In such a situation, $UE_1$ 10 can be equipped with D2D application 14 for relaying information to another $UE_2$ 300 via D2D interface 310. $UE_2$ 300 can then retransmit the MC data (possibly via intermediate UEs) to AP 330 (or AP 20 if in range). The receiving AP 330 can forward the MC data to CC 50. The AP 330 may also include an MC function (not shown). In some aspects, $UE_2$ 300 may have similar functionality to the sending device $UE_1$ 10, including the ability to cache MC data received from $UE_1$ 10 for subsequent forwarding to the CC 50.

In some embodiments, even if AP 20 can communicate with $UE_1$ 10, the D2D interface 14 can be utilized for redundancy, to ensure MC data is received by CC 50, in the event AP 20 or link 30 fails. In an aspect, the D2D application 14 may be employed to allow $UE_2$ 300 to receive a copy of the MC data generated by the $UE_1$ 10, and to add MC data captured by $UE_2$ 300 to the received copy to form a second record of the event. The second record, or a portion thereof, may be stored at the $UE_2$ 300, and/or may be forwarded to a node or the CC 50 as part of the MC session.

In some embodiments, CC 50 can request other MC configured devices in an emergency area to enter MC mode, once a MC session is established to provide assistance to the sending device if necessary. The CC 50 may evaluate an urgency level of the original MC session request to determine whether to request that other UE's act as MC resources.

Figure 4:
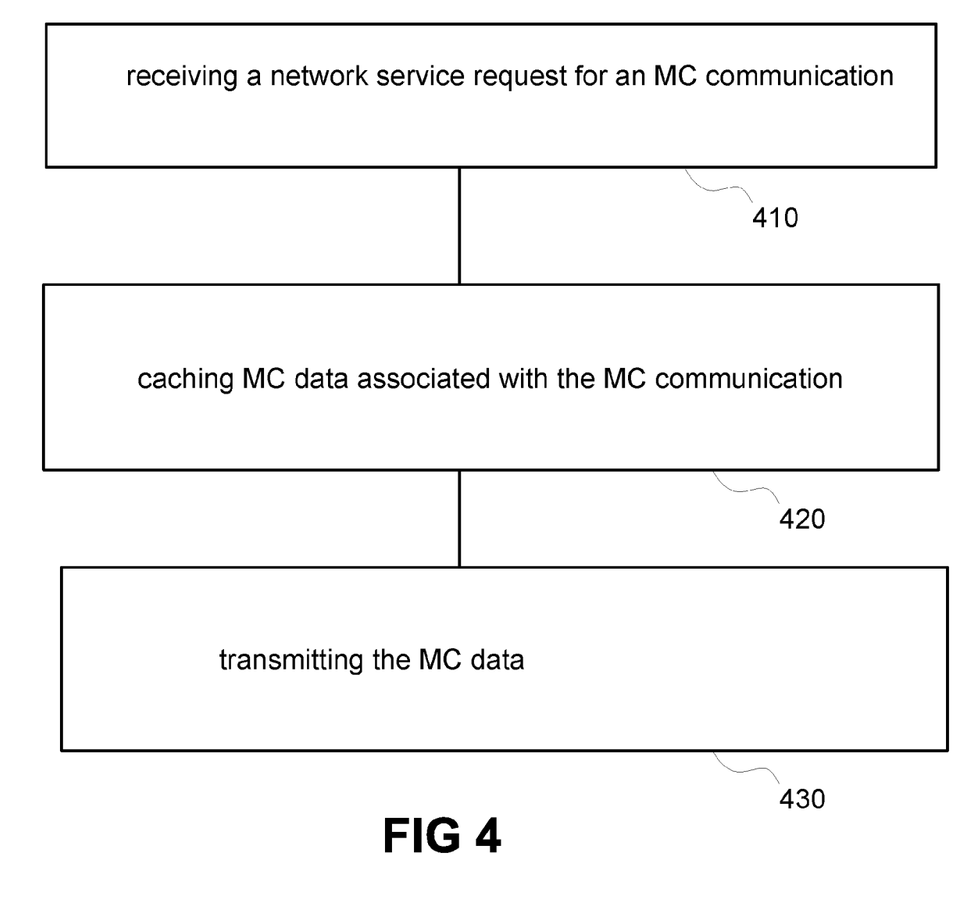
FIG. 4 illustrates a method for MC communication, according to an embodiment.

FIG. 4 illustrates a method for mission critical (MC) communication, according to an embodiment. Such an MC method includes receiving a network service request for an MC communication 410 and caching MC data associated with the MC communication 420. The method also includes subsequently and/or concurrently transmitting the MC data 430. Either one or more access points (APs), or user equipment (UE), or both, can cache the data. In some embodiments the method further includes prioritizing network resources for MC communication. In some embodiments the method can also include instructing a $UE_1$ 10 to store and transmit sensor data which may be relevant to responding to an emergency situation. In some embodiments the $UE_1$ 10 transmits MC data to a second $UE_2$ 300 for relaying, in the event of disruption in the communication links between the $UE_1$ 10 and the network.

In this specification, mission critical communication refers to a critical communication for which the delivery and/or recovery of data is important, either during a critical situation or subsequent investigation. It includes emergency calls. It should be appreciated that not all data which some organizations might consider "mission critical" would be appropriate for caching.

In some situations, the system only caches some information, such as a few packets of a session, which might, for example be used for future investigations when something happened to the user or transmitting device. This may be useful if the system is strained for resources and cannot cache all information.

In some embodiments the transmitted MC data, and any cached MC data, can be rerouted to a predefined destination in the event the destination is not available. For example, for an MC session established between UE's of two officers, the MC session may be automatically rerouted to a command center (e.g., CC 50) or some other destination previously established for an emergency responder organization.

Figure 5:
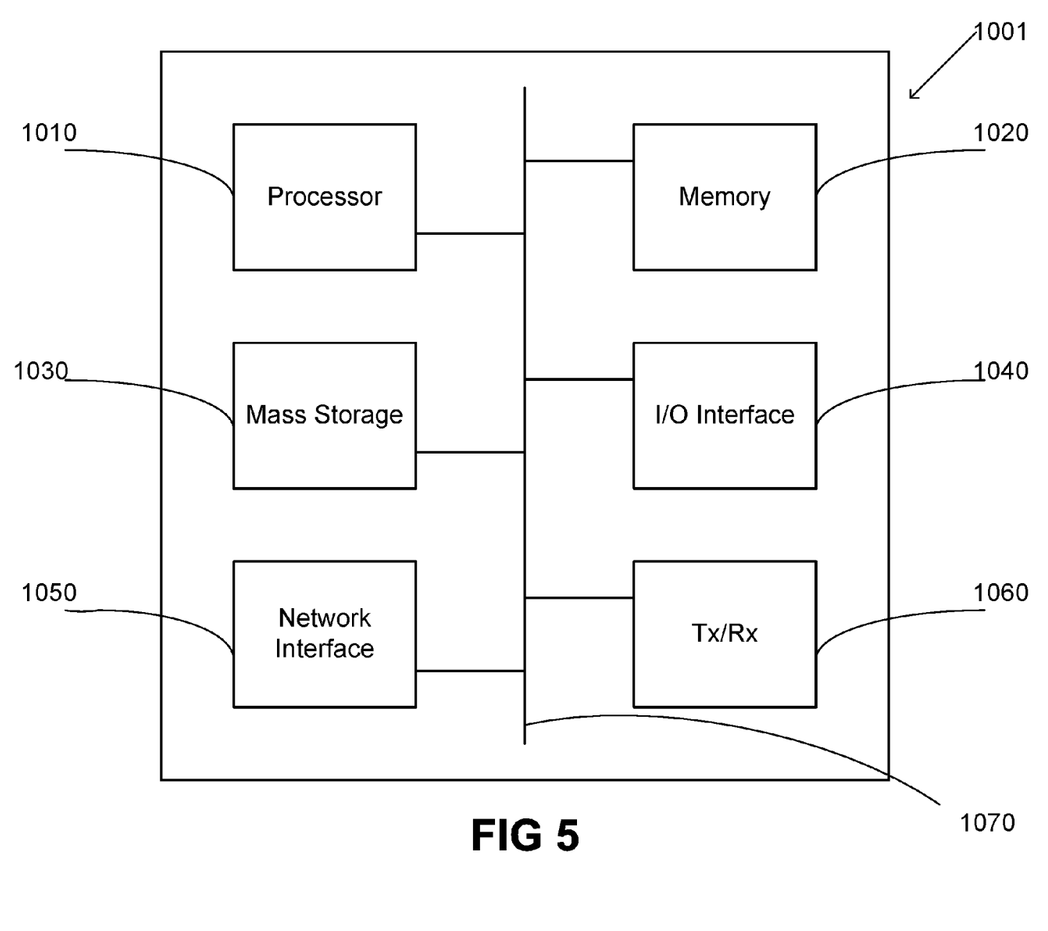
FIG. 5 is a block diagram of a processing system according to an embodiment.

FIG. 5 is an exemplary block diagram of a processing system 1001 that may be used for implementing the various network elements, for example the control center system 50, the MC-A/Cache 22/23 or the AP 20 or the UE 10. As shown in FIG. 5, processing system 1001 includes a processor 1010, working memory 1020, non-transitory storage 1030, network interface, I/O interface 1040, and depending on the node type, a transceiver 1060, all of which are communicatively coupled via bi-directional bus 1070.

According to certain embodiments, all of the depicted elements may be utilized, or only a subset of the elements. Further, the processing system 1001 may contain multiple instances of certain elements, such as multiple processors, memories, or transceivers. Also, elements of processing system 1001 may be directly coupled to other components without the bi-directional bus.

It will be readily understood that, throughout the preceding discussion, the above-described network functionalities and operations may correspond to a method for use in supporting operation of a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality, possibly through virtualization technologies. Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which can be allocated for providing various computing resources which in turn are used to realize various computing components of a system, may be regarded as providing a distributed computing system, the internal architecture of which may be configured in various ways. For example, one or more generic hardware platforms can be configured to provide the MC and caching functions, which in some embodiments may be co-located with APs. In some embodiments the APs themselves may include generic radio access nodes controlled by virtual functions. In such an embodiment, due to the urgency of MC applications, an MC function may constantly be instantiated, and possibly active, at each AP. As soon as an MC call is initiated, additional MC functions can be instantiated to be ready if needed, and MC related virtual functions can be given precedent over less crucial functions.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include a number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for transmitting data between a User Equipment (UE) and an intended recipient device over a communication network, the method comprising, at a network node of the communication network:

receiving, from at least one of: another network node of the communication system, a control center, the intended recipient, and another UE, a mission critical (MC) session request for a MC communication;

in response to receiving the MC session request, establishing a MC session with the UE for the MC communication, wherein establishing comprises: forwarding the MC session request to the UE and instructing the UE to collect MC data and to carry out at least one of caching at least some of the collected MC data; and,
transmitting at least some of the collected MC data to
the network node;
receiving, from the UE, MC data associated with the MC
session; and
caching at least a portion of the received MC data for
transmission to the intended recipient device.

2. The method of claim 1, further comprising:
sending the MC session request response to the UE to start
transmitting the MC data.

3. The method of claim 1 further comprising forwarding
the MC session request to the intended recipient device.

4. The method of claim 3 wherein caching comprises
caching the at least a portion of the received MC data prior
to receiving an MC session request response, from the
intended recipient device acknowledging receipt of the MC
session request.

5. The method of claim 1 wherein establishing comprises
prioritizing network resources for the MC session.

6. The method of claim 5 wherein prioritizing network
resources comprises communicating with other network
nodes on the network to reduce network data traffic during
the MC session.

7. The method of claim 1, further comprising:
after receiving the MC session request, instructing the UE
to perform at least one of:
conserving computing resources to prioritize the MC
session;
entering a low power state if a battery condition of the
UE is below a predetermined threshold; and
activating at least one sensor of the UE to capture data;
and at least one of:
storing the captured data on the UE; and,
transmitting at least some of the captured data as MC
data to the network.

8. The method of claim 1, further comprising:
detecting that the intended recipient device has not
received the at least some of the received MC data; and,
re-transmitting the at least some of the received MC data
to at least one of:
the intended recipient device, and
a pre-defined destination in place of the intended recipient device.

9. The method of claim 1, further comprising:
transmitting at least some of the at least a portion of the
received MC data to the intended recipient device.

10. The method according to claim 1, wherein the network
node is an access point (AP).

11. A method for transmitting data to an intended recipient
device over a communication network, the method comprising, at a user equipment (UE) coupled to the communication
network:
receiving a mission critical (MC) session request, the MC
session request comprising instructions to active one or
more MC sensors;
activating each of the one or more MC sensors and
capturing MC data from each of the one or more MC
sensors;
establishing an MC session for MC communication with
a network node of the communication; and,
after receiving a MC session request response to start
transmission of the MC data, transmitting the MC data
to the network node for forwarding to the intended
recipient device, wherein the MC session request
response is received before receiving an acknowledgment of a MC request from the intended recipient
device.

12. The method of claim 11 further comprising caching
the MC data before transmitting the MC data to the network
node.

13. The method of claim 11, wherein transmitting comprises sending the MC data to a relay UE device for
forwarding the MC data to the network node.

14. The method of claim 11, wherein receiving comprises
receiving the MC request from the intended recipient.

15. The method of claim 11, further comprising, when the
MC session is established, at least one of:
conserving computing resources to prioritize the MC
session; and
entering a low power state if a battery condition of the UE
is below a predetermined threshold.

16. A User Equipment (UE) comprising:
a processor; and
a non-transitory memory storing computer-readable
instructions which, when executed by the processor,
cause the UE to:
receive a mission critical (MC) session request for MC
communication, the MC session request comprising
instructions to active one or more MC sensors;
activate each of the one or more MC sensors and capture
MC data from each of the one or more MC sensors;
establish an MC session for the MC communication with
the network node of the communication system; and
after receipt of a session request response to start transmission of the MC data, transmit the MC data to the
network node for forwarding to an intended recipient
device, wherein the MC session request response is
received before receiving an acknowledgment of a MC
session request from the intended recipient device.

17. The UE of claim 16, wherein the computer-readable
instructions which, when executed by the processor, cause
the UE to cache the MC data before transmitting the MC
data to the network node.

18. The UE of claim 16, wherein the computer-readable
instructions which, when executed by the processor, cause
the UE to at least one of: conserve computing resources to
prioritize the MC session; and enter a low power state if a
battery condition of the UE is below a predetermined
threshold.

19. A network node in a communication network comprising:
a processor; and
a non-transitory memory storing computer-readable
instructions which, when executed by the processor,
cause the network node to:
receive, from at least one of: another network node of
the communication system, the UE, a control center,
the intended recipient, and another UE, a mission
critical (MC) session request for MC communication;
in response to receipt of the MC session request, establish
a MC session with the UE for the MC communication
by forwarding the MC request to the UE and instructing
the UE to collect MC data and to carry out at least one
of
caching at least some of the collected MC data; and,
transmitting at least some of the collected MC data to
the network node;
receive, from the UE, MC data associated with the MC
session; and
cache at least a portion of the received MC data for
transmission to an intended recipient device.

20. The network node of claim 19, wherein the computer-readable instructions, which, when executed by the processor, cause the network node to at least one of:
   transmit at least some of the at least a portion of the received MC data to the intended recipient device;
   send an MC session request response to the UE to start transmitting the MC data;
   forward an MC session request to the intended recipient device;
   cache at least a portion of the received MC data for transmission to the intended recipient device by caching the at least a portion of the received MC data prior to receiving an MC session request response, from the intended recipient device acknowledging the MC session request; and
   establish a MC session with the UE by prioritizing network resources for the MC session by communicating with other network nodes on the network to reduce network data traffic during the MC session.

* * * * *